(12) United States Patent
Roth et al.

(10) Patent No.: US 10,081,370 B2
(45) Date of Patent: *Sep. 25, 2018

(54) SYSTEM FOR A VEHICLE (71) Applicant: Harman Becker Automotive Systems GmbH, Karlsbad (DE)

(72) Inventors: Hans Roth, Karlsruhe (DE); Olaf Preissner, Kirchheim unter Teck (DE); Michael Reuss, Bretten (DE); Stephan Bergmann, Muggensturm (DE)

(73) Assignee: Harman Becker Automotive Systems GmbH, Karlsbad (DE)

(*) Notice: Subject to any disclaimer, the term of this patent is extended or adjusted under 35 U.S.C. 154(b) by 123 days.

This patent is subject to a terminal disclaimer.

(21) Appl. No.: 14/654,477

(22) PCT Filed: Dec. 19, 2013

(86) PCT No.: PCT/EP2013/003860
§ 371 (c)(1),
(2) Date: Jun. 19, 2015

(87) PCT Pub. No.: WO2014/095067
PCT Pub. Date: Jun. 26, 2014

(65) Prior Publication Data
US 2015/0331236 A1    Nov. 19, 2015

Related U.S. Application Data (60) Provisional application No. 61/745,229, filed on Dec. 21, 2012.

(51) Int. Cl.
*H04W 4/80* (2018.01)
*B60W 50/10* (2012.01)
(Continued)

(52) U.S. Cl.
CPC ............ *B60W 50/10* (2013.01); *B60K 35/00* (2013.01); *B60K 37/00* (2013.01); *B60Q 9/008* (2013.01);
(Continued)

(58) Field of Classification Search
CPC .................................................... B60W 50/10
See application file for complete search history.

(56) References Cited

U.S. PATENT DOCUMENTS 6,720,966 B2 * 4/2004 Barth .................... G06T 11/005
250/363.04
8,902,254 B1 * 12/2014 Laughlin .............. G06T 19/006
345/633
(Continued)

FOREIGN PATENT DOCUMENTS

DE    102007058295 A1    6/2009
EP         1720131 A1   11/2006
(Continued)

OTHER PUBLICATIONS

Augmented Reality with Automatic Camera Calibration for Driver Assistance Systems, Jung et al., Graduate School of Applied Computing Universidade do Vale do Rio dos Sinos—Unisinos, Jun. 1st 2009.*

(Continued)

*Primary Examiner* — Jay Patel
*Assistant Examiner* — Irfan Habib
(74) *Attorney, Agent, or Firm* — McCoy Russell LLP (57) ABSTRACT

Embodiments are disclosed for systems for a vehicle. An example system for a vehicle includes a head-up display, a central unit having a circuit, connected to the head-up display, and a recording means for recording first image data of surroundings of the vehicle, wherein the circuit is configured to recognize an object in the surroundings based on
(Continued)

the recorded first image data, wherein the head-up display is configured to project an image onto a windshield or onto a combiner of the vehicle, and wherein the circuit is configured to generate second image data for outputting the image and to send the image to the head-up display, to generate a virtual barrier in the second image data, and to position the virtual barrier within the image based on a determined position of the recognized object.

11 Claims, 6 Drawing Sheets

(51) Int. Cl.
| | |
|---|---|
| G02B 27/01 | (2006.01) |
| B60R 11/02 | (2006.01) |
| H04N 13/02 | (2006.01) |
| H04N 13/04 | (2006.01) |
| H04N 9/31 | (2006.01) |
| B60K 35/00 | (2006.01) |
| B60Q 9/00 | (2006.01) |
| H04M 3/54 | (2006.01) |
| H04M 1/60 | (2006.01) |
| B60K 37/00 | (2006.01) |
| G01C 21/36 | (2006.01) |
| H04W 4/04 | (2009.01) |
| H04W 4/16 | (2009.01) |
| G08G 1/00 | (2006.01) |
| G08G 1/0962 | (2006.01) |
| G06F 3/01 | (2006.01) |
| G06F 3/0481 | (2013.01) |
| H04N 101/00 | (2006.01) |

(52) U.S. Cl.
CPC ........ *B60R 11/0229* (2013.01); *G01C 21/365* (2013.01); *G02B 27/01* (2013.01); *G02B 27/0101* (2013.01); *G06F 3/013* (2013.01); *G06F 3/017* (2013.01); *G06F 3/0481* (2013.01); *G08G 1/00* (2013.01); *G08G 1/09623* (2013.01); *H04M 1/6075* (2013.01); *H04M 3/543* (2013.01); *H04N 9/31* (2013.01); *H04N 13/0242* (2013.01); *H04N 13/0278* (2013.01); *H04N 13/0282* (2013.01); *H04N 13/0459* (2013.01); *H04W 4/046* (2013.01); *H04W 4/16* (2013.01); *H04W 4/80* (2018.02); *B60K 2350/1052* (2013.01); *B60K 2350/1072* (2013.01); *B60K 2350/1076* (2013.01); *B60K 2350/2052* (2013.01); *B60K 2350/2095* (2013.01); *G02B 2027/014* (2013.01); *G02B 2027/0138* (2013.01); *G02B 2027/0141* (2013.01); *G06F 2203/04804* (2013.01); *H04N 2101/00* (2013.01)

(56) References Cited

U.S. PATENT DOCUMENTS

| | | | | |
|---|---|---|---|---|
| 9,113,050 | B2* | 8/2015 | Laughlin | H04N 7/185 |
| 9,216,745 | B2* | 12/2015 | Beardsley | B60W 50/10 |
| 9,429,912 | B2* | 8/2016 | Fleck | G03H 1/2249 |
| 9,616,901 | B2* | 4/2017 | Sakoda | G06F 17/00 |
| 9,630,631 | B2* | 4/2017 | Alaniz | A63F 13/00 |
| 9,685,005 | B2* | 6/2017 | Kjallstrom | G06T 19/006 |
| 9,754,417 | B2* | 9/2017 | Matsubayashi | G06T 19/006 |
| 9,809,231 | B2* | 11/2017 | Ling | B60W 50/10 |
| 2003/0142041 | A1* | 7/2003 | Barlow | A61B 3/113 |
| | | | | 345/8 |
| 2007/0038944 | A1* | 2/2007 | Carignano | G06T 15/20 |
| | | | | 715/757 |
| 2009/0222203 | A1 | 9/2009 | Mueller | |
| 2010/0253541 | A1* | 10/2010 | Seder | G01S 13/723 |
| | | | | 340/905 |
| 2011/0216089 | A1* | 9/2011 | Leung | G06T 7/35 |
| | | | | 345/633 |
| 2012/0224060 | A1* | 9/2012 | Gurevich | B60R 1/00 |
| | | | | 348/148 |
| 2012/0224062 | A1* | 9/2012 | Lacoste | G01C 21/365 |
| | | | | 348/148 |
| 2013/0113923 | A1* | 5/2013 | Chien | B60R 1/00 |
| | | | | 348/135 |
| 2013/0315446 | A1* | 11/2013 | Ben Tzvi | G06T 19/006 |
| | | | | 382/104 |
| 2014/0276090 | A1* | 9/2014 | Breed | A61B 5/18 |
| | | | | 600/473 |

FOREIGN PATENT DOCUMENTS

| | | |
|---|---|---|
| JP | 2006031618 A | 2/2006 |
| JP | 2007257286 A | 10/2007 |
| JP | 2009029203 A | 2/2009 |
| WO | 2009157828 A1 | 12/2009 |

OTHER PUBLICATIONS

Jung, C. et al., "Augmented Reality with Automatic Camera Calibration for Driver Assistance Systems," Proceedings of the XI Symposium on Virtual and Augmented Reality, Jun. 1, 2009, Available Online at http://www.lbd.dcc.ufmg.br/colecoes/svr/2009/001.pdf, 8 pages.

ISA European Patent Office, International Search Report Issued in Application No. PCT/EP2013/003860, dated Apr. 23, 2014, WIPO, 3 pages.

IPEA European Patent Office, International Preliminary Report on Patentability Issued in Application No. PCT/EP2013/003860, Report Completed Apr. 17, 2015, WIPO, 6 pages.

Japan Patent Office, Office Action Issued in Application No. 2015-548282, dated Oct. 16, 2017, 8 pages.

* cited by examiner

SYSTEM FOR A VEHICLE

CROSS REFERENCE TO RELATED APPLICATIONS

The present application is a U.S. National Phase of International Patent Application Serial No. PCT/EP/2013/003860, entitled "A SYSTEM FOR A VEHICLE," filed on Dec. 19, 2013, which claims priority to U.S. Provisional Patent Application No. 61/745,229, entitled "INFOTAINMENT SYSTEM," filed on Dec. 21, 2012, the entire contents of each of which are hereby incorporated by reference for all purposes.

TECHNICAL FIELD

The present invention relates to a system for a vehicle.

BACKGROUND AND SUMMARY

EP 1 720 131 B1 describes an augmented reality system with real marker object identification. The system comprises a video camera for gathering image data from a real environment. The real environment represents any appropriate area, such as a room of a house, a portion of a specific landscape, or any other scene of interest. The real environment represents a living room comprising a plurality of real objects for instance in the form of walls and furniture. Moreover, the real environment comprise further real objects that are considered as marker objects which have any appropriate configuration so as to be readily identified by automated image processing algorithms. The marker objects have formed thereon significant patterns that may easily be identified, wherein the shape of the marker objects may be designed so as to allow identification thereof from a plurality of different viewing angles. The marker objects also represent substantially two-dimensional configurations having formed thereon respective identification patterns.

The system further comprises a means for identifying the marker objects on the basis of image data provided by the camera. The identifying means may comprise well-known pattern recognition algorithms for comparing image data with predefined templates representing the marker objects. The identifying means may have implemented therein an algorithm for converting an image, obtained by the camera, into a black and white image on the basis of predefined illumination threshold values. The algorithms are further configured to divide the image into predefined segments, such as squares, and to search for pre-trained pattern templates in each of the segments, wherein the templates represent significant portions of the marker objects.

First the live video image is turned into a black and white image based on a lighting threshold value. This image is then searched for square regions. The software finds all the squares in the binary image, many of which are not the tracking markers, such as the objects. For each square, the pattern inside the square is matched against some pre-trained pattern templates. If there is a match, then the software has found one of the tracking markers, such as the objects. The software then uses the known square size and pattern orientation to calculate the position of the real video camera relative to the physical marker such as the objects. Then, a 3×4 matrix is filled with the video camera's real world coordinates relative to the identified marker. This matrix is then used to set the position of the virtual camera coordinates. Since the virtual and real camera coordinates are the same, the computer graphics that are drawn precisely superimpose the real marker object at the specified position. Thereafter, a rendering engine is used for setting the virtual camera coordinates and drawing the virtual images.

The system further comprises means for combining the image data received from the camera with object data obtained from an object data generator. The combining means comprise a tracking system, a distance measurement system, and a rendering system. Generally, the combining means is configured to incorporate image data obtained from the generator for a correspondingly identified marker object so as to create virtual image data representing a three-dimensional image of the environment with additional virtual objects corresponding to the marker objects. Hereby, the combining means is configured to determine the respective positions of the marker objects within the real environment and also to track a relative motion between the marker objects with respect to any static objects in the environment and with respect to a point of view defined by the camera.

The system further comprises output means configured to provide the virtual image data, including the virtual objects generated by the generator wherein, in preferred embodiments, the output means is also configured to provide, in addition to image data, other types of data, such as audio data, olfactory data, tactile data, and the like. In operation, the camera creates image data of the environment, wherein the image data corresponds to a dynamic state of the environment which is represented by merely moving the camera with respect to the environment, or by providing moveable objects within the environment; for instance the marker objects or one or more of the objects are moveable. The point of view of the environment is changed by moving around the camera within the environment, thereby allowing to observe especially the marker objects from different perspectives so as to enable the assessment of virtual objects created by the generator from different points of view.

The image data provided by the camera, which are continuously updated, are received by the identifying means, which recognizes the marker objects and enables the tracking of the marker objects once they are identified, even if pattern recognition is hampered by continuously changing the point of view by, for instance, moving the camera or the marker objects. After identifying a predefined pattern associated with the marker objects within the image data, the identifying means inform the combining means about the presence of a marker object within a specified image data area and based on this information, the means then continuously track the corresponding object represented by the image data used for identifying the marker objects assuming that the marker objects will not vanish over time. The process of identifying the marker objects is performed substantially continuously or is repeated on a regular basis so as to confirm the presence of the marker objects and also to verify or enhance the tracking accuracy of the combining means. Based on the image data of the environment and the information provided by the identifying means, the combining means creates three-dimensional image data and superimposes corresponding three-dimensional image data received from the object generator, wherein the three-dimensional object data are permanently updated on the basis of the tracking operation of the means.

The means may, based on the information of the identifying means, calculate the position of the camera with respect to the marker objects and use this coordinate information for determining the coordinates of a virtual camera, thereby allowing a precise "overlay" of the object data delivered by the generator with the image data of the marker objects. The coordinate information also includes data on the relative orientation of the marker objects with respect to the camera, thereby enabling the combining means to correctly adapt the orientation of the virtual object. Finally, the combined three-dimensional virtual image data is presented by the output means in any appropriate form. The output means may comprise appropriate display means so as to visualize the environment including virtual objects associated with the marker objects. When the system is operated, it is advantageous to pre-install recognition criteria for at least one marker object so as to allow a substantially reliable real-time image processing. Moreover, the correlation between a respective marker object and one or more virtual objects may be established prior to the operation of the system or is designed so as to allow an interactive definition of an assignment of virtual objects to marker objects. For example, upon user request, virtual objects initially assigned to the marker object are assigned to the marker object and vice versa. Moreover, a plurality of virtual objects is assigned to a single marker object and a respective one of the plurality of virtual objects is selected by the user, by a software application.

The object of the invention is to improve a system for a motor vehicle.

Said object is attained by a system with the features of independent claim 1. Advantageous refinements are the subject of dependent claims and are included in the description.

Accordingly, a system for a vehicle is provided. The system can also be called an infotainment system, if it has both information and entertainment functions.

The system has a head-up display.

The system has a circuit which is connected to the head-up display. The circuit may be integrated into a central unit. Alternatively the circuit may be integrated into a housing having the head-up display.

The system has recording means for recording first image data of the vehicle surroundings. The recording means is connected to the circuit.

The circuit is configured to recognize an object in the surroundings based to the recorded first image data. This functionality may also be referred to as object recognition.

The head-up display is configured to project an image onto a windshield of the vehicle or onto a combiner in the driver's field of view. The combiner may be distanced from the windshield. The combiner is a reflecting at least partly transparent pane, e.g. made of transparent plastic material.

The circuit is configured to generate second image data for outputting the image and to send them to the head-up display.

The circuit is configured to generate a virtual barrier in the second image data.

The circuit is configured to position the virtual barrier within the image based on a determined position of the recognized object, whereby the positioned virtual barrier in the driver's view direction to the recognized object overlaps the recognized object at least partially.

Tests by the applicant have shown that intuitively understandable warning information can be output to the driver by the virtual barrier. Thus, the driver need not first interpret a symbol and associate the interpreted symbol with a source of danger. The interpretation and association with danger are taken over by the virtual barrier positioned in the field of view.

Advantageous embodiments of the system will be described below.

According to one embodiment, the virtual barrier may be a virtual wall. The driver would like to avoid collision with a wall instinctively, so that the driver can countersteer rapidly and nearly reflexively and gain valuable fractions of a second of time before a possible collision.

According to one embodiment, the virtual barrier may be semitransparent. Because of the transparency of the virtual barrier the driver can recognize real objects through the virtual barrier, for example, a moving trunk.

According to one embodiment, the recognized object may be a road marking. The road marking may be a side line or a center line in white or yellow.

According to one embodiment, the recognized object may be a traffic sign. The traffic sign may be a "no entry" placed at the exit ends of a one-way street. The virtual barrier may overlap the traffic sign and virtually closing the exit end of the one-way street, so that the driver is hindered to drive in the wrong direction virtually.

According to one embodiment, the recognized object may be a constructional boundary of a road. The constructional boundary may be a kerb stone edge. The virtual barrier may overlap the kerb stone edge.

According to one embodiment, the circuit may be configured to generate the virtual barrier when a warning signal exceeds a threshold. According to one embodiment, the circuit may be configured to generate the warning signal based on a determined distance of the vehicle to the object. Alternatively, the warning signal can also be generated depending on other input variables, for example, traffic rules or the like.

According to one embodiment, the circuit may be configured to recognize a road user. The circuit may be configured to generate the warning signal depending on the recognition of the road user in the blind spot.

The previously described embodiments are especially advantageous both individually and in combination. In this regard, all embodiments can be combined with one another. Some possible combinations are explained in the description of the exemplary embodiments shown in the figures. These possible combinations of the features depicted therein, are not definitive, however.

BRIEF DESCRIPTION OF FIGURES

The invention will be described in greater detail hereinafter by exemplary embodiments using graphic illustrations.

Shown are.

DETAILED DESCRIPTION

Figure 1:
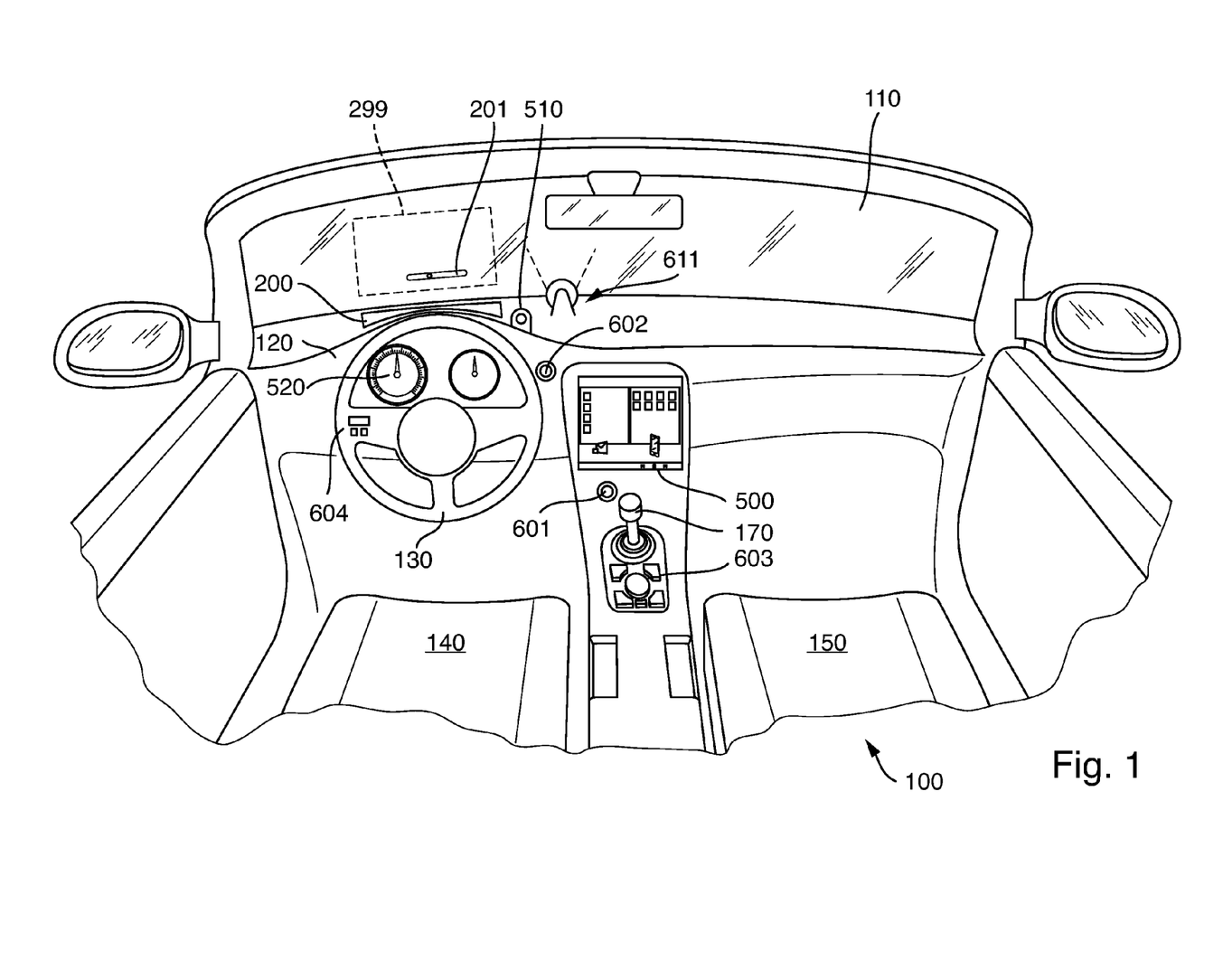
FIG. 1 a schematic representation of a vehicle interior.

FIG. 1 shows a schematic representation of a vehicle interior. According to one embodiment of FIG. 1, the vehicle 100 may include a driver seat 140 and a passenger seat 150. The vehicle 100 may further include a steering wheel 130 on the driver's side and a gearshift 170 and a front windshield 110. According to one embodiment of FIG. 1, a system may be provided, the system also referred to as an infotainment system providing information and entertainment functionality.

The infotainment system may have a central unit 500 providing a user interface. The infotainment system may have, or be in communication with, an instrument cluster display 520. According to one embodiment, the instrument cluster display 520 may be arranged inline with the position of steering wheel 130, so that the user may see the displayed information content through the openings in steering wheel 130. The instrument cluster display 520 may be a color screen.

The infotainment system may have a head-up display 200. The head-up display may also be referred to as head unit display 200. The head-up display 200 may be configured to project an image 201 onto a front windshield 110. A surface of front windshield 110 may reflect the projected image 201 towards the user, in the case of one embodiment of FIG. 1, towards the driver of the vehicle 100. According to one embodiment shown in FIG. 1, the projected image 201 can be of the size of a reflection area 299. The form of front windshield 110 may deviate from a flat reflection surface, and an electronic rectification and/or optical rectification may be used. A cheap alternative is a separate combiner (not shown). The combiner is at least partially transparent and has a reflection surface. The combiner may be positioned between the windshield and the driver/user in the viewing direction of the driver/user.

The infotainment system may have adjustment means for adjusting the position of the projected image 201 within the plane the of front windshield 110. The adjustment means may comprise an actuating drive controlling the position of an optical element of the head-up display 200 and/or the head-up display 200 itself. The position and/or size of the reflection area 299 within the front windshield 110 may be controlled by means of parameters. The central unit 500 may be configured to ascertain the position of the user's eyes based on parameters of the adjustment of the projected image 201.

According to one embodiment of FIG. 1 the infotainment system may have an input device 601, 602, 603, 604, 605. A Sensor 602 may be one input device 602 positioned in the dashboard 120 having a sensitivity directed toward the steering wheel 130 of the vehicle 100. The sensor 602 may be arranged and configured to determine a position and/or a movement of a user's hand between the steering wheel 130 and dashboard 120. Another sensor 601 may be positioned in the center console to enable input in the area of central unit 500.

The infotainment system may have an input device 603 in the central console. The input device 603 may be part of the user interface, and may have one or more push-buttons, input wheels, and so forth. The system may have an input device 604 integrated in steering wheel 130, having one or more push-buttons, switches, and so forth. The infotainment system may have an internal camera 510 recording an image of the user.

The system may have recording means 611 for recording first image data of the surroundings of vehicle 100. The recording means in one embodiment of FIG. 1 may be a video camera, which records at least the surroundings in front of vehicle 100 through the windshield. Alternatively, recording means 611 may be arranged at a different position in the vehicle, for example, in the area of the headlight. The recording means 611 may be connected to the central unit 500 for transmitting the first image data of the surroundings. The central unit 500 may be configured in this case to recognize an object of the surroundings based to the recorded first image data.

Figure 2:
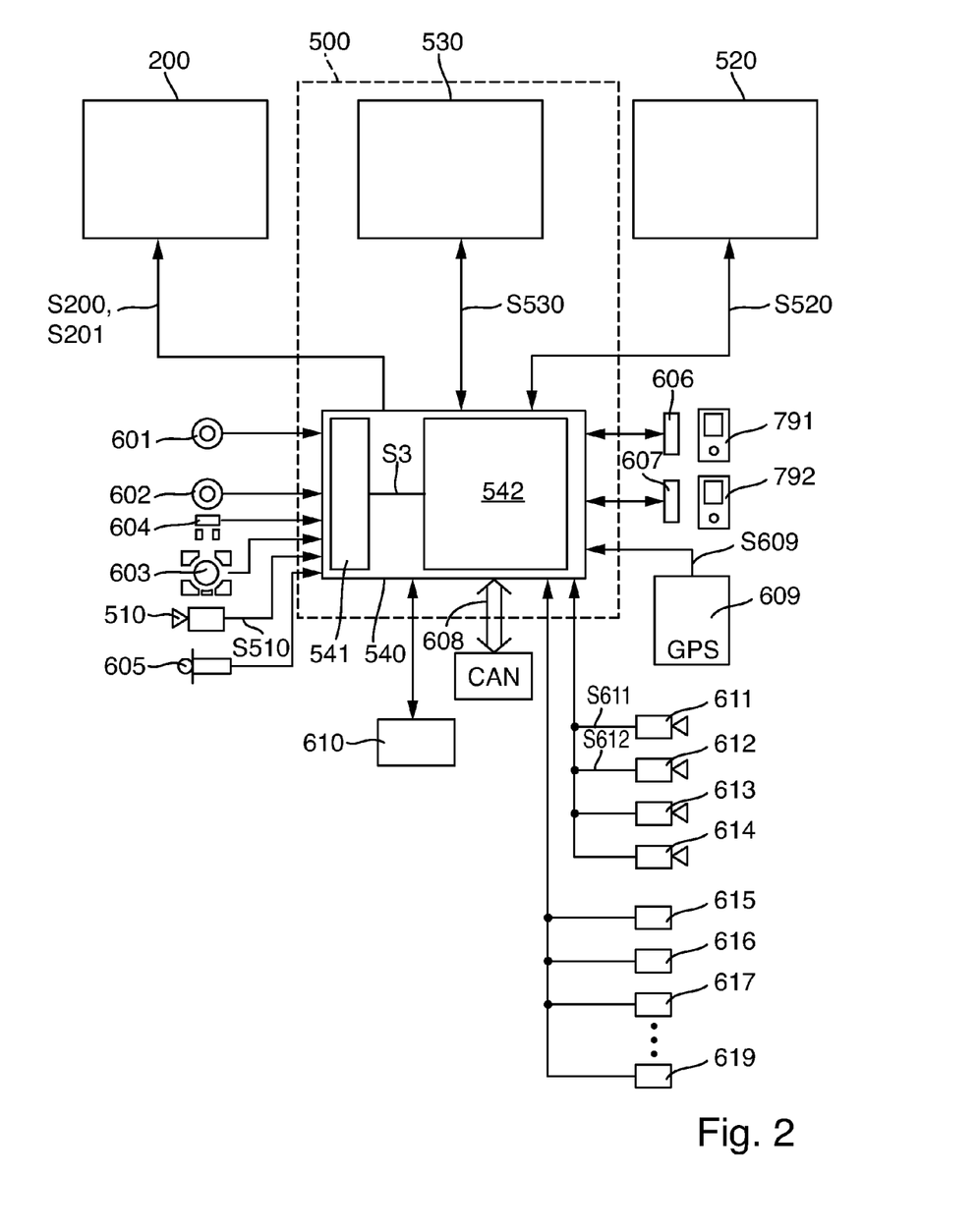
FIG. 2 a schematic block circuit diagram of an exemplary embodiment of a system.

FIG. 2 shows a block circuit diagram of an example of the system for a motor vehicle 100. The system may have a central unit 500. Central unit 500 may have a circuit 540. Circuit 540 may have a processor to run a program. Circuit 540 may have a plurality of interfaces to connect other devices 601 etc. Central unit 500 may have a central information display 530 that may be centrally arranged in dashboard 120 or center console of vehicle 100. Central information display 530 may be touch screen, comprising a touch sensitive surface for user input.

According to one embodiment of FIG. 2, a system for a vehicle 100 is provided. The system may have a head-up display 200, which is connected to a central unit 500. Head-up display 200 may be configured to project an image 201 onto a windshield 110 of vehicle 100 in the driver's field of view.

The system may have a recording means 611 for recording first image data S611 of the surroundings of vehicle 100. The recording means 611 is connected to the central unit 500. According to one embodiment the system may have one or more cameras 611, 612, 613, 614 positioned to record the image of the surroundings 400 of the vehicle 100. According to one embodiment, the central unit 500 may be connected to a front camera 611 capturing image data S611 of the road and traffic in front of the vehicle 100.

Additionally the central unit 500 may be connected to a back camera 612 capturing image data S612 of the road and traffic behind the vehicle 100. The central unit 500 may be connected to a left camera 613 and/or to a right camera 614 recording an image correspondingly. The one or more cameras 611, 612, 613, 614 may be used to record the entire surroundings of the vehicle 100 concurrently.

According to one embodiment, central unit 500 is configured to recognize an object of the surroundings based on the recorded first image data S611. The circuit 540 of the central unit 500 may be configured to run an object recognition program to recognize objects in the recorded image data S611, S612. The recognized object may be road markings or a road user like a vehicle.

According to one embodiment, central unit 500 may be configured to generate second image data S200 for outputting image 201. The second image data S200 may be sent from central unit 500 to head-up display 200 via a connection, for example, a cable. Function block 542 of the circuit 540 may be configured to generate second image data S200 output to the head up display 200. Additionally the function block 542 of the circuit 540 may be configured to generate image data S530 output to the central display 530 of the central unit 500 and image data S520 output to the display 520.

According to one embodiment, central unit 500 may be configured to generate a virtual barrier in the second image data S200. A virtual barrier may be a virtual wall or a row of traffic cones or the like, which may be computer generated by rendering as a vector graphic. According to one embodiment, central unit 500 may be configured to position the virtual barrier within the image based on a determined position of the recognized object, so that the positioned virtual barrier in the driver's view direction to the recognized object overlaps the recognized object at least partially.

According to one embodiment in FIG. 2, the circuit 540 may have a function block 541 for evaluating input signals. The function block 541 can be realized by hardware or as a program sequence by software. Input signals in the embodiment in FIG. 2 are at least the first image data S611 of the front camera. Objects from the surroundings of vehicle 100 are detected by means of image recognition in function block 541 by means of the first image data S611. According to one embodiment, the function block 541 may be configured to output a position signal of the position of the recognized object. The position of the recognized object relative to the position of vehicle 100 can be output.

According to one embodiment, first function block 541 of circuit 540 of central unit 500 may be configured to generate a warning signal S3. Central unit 500 may be configured to generate the virtual barrier when warning signal S3 exceeds a threshold. According to one embodiment, central unit 500 may be configured to generate the warning signal S3 based on a determined distance of vehicle 100 to the object. Alternatively or in addition, warning signal S3 can be based, moreover, on other data, such as position data S609 of a position determining system 609 or signals from radar sensors 615, 616, 617, 619.

Warning signal S3 may include data such as a value, a vector, or a matrix, which represents a risk of collision for vehicle 100. Warning signal S3 may be output to an input of control function block 542. The function block 542 may be configured to generate the second image data S200, S530, S520 based on the warning signal S3. In particular, virtual barrier 210 can be generated based on warning signal S3.

According to one embodiment of FIG. 2, sensors 601, 602 and input devices 603, 604 and a microphone 605 to record the voice of the user may be connected. The central unit 500 may be configured to run a voice recognition program for vocal control inputs. The infotainment system may have an internal camera 510 capturing a user's face. The internal camera 510 may send image data S510 to the central unit 500 for evaluation. The central unit 500 may be configured to recognize the user's eyes. The central unit 500 may be configured to ascertain a position of the user's eyes concurrently.

A head-up display 200 and/or an instrument cluster display 520 and/or a central information display 530 of the central unit 500 and/or a first sensor 601 and/or a second sensor 602 and/or a first near field connection device 606 for connection with a mobile device 791 and/or a second near field connection device 607 for connection with a mobile device 792 and/or an input device 603, 604 may be connected to or in communication with circuit 540. The sensor 601, 602 may be of a contactless type. The sensor 601, 602 may be an infrared sensor.

According to one embodiment, an infotainment system of a vehicle 100 may include an imaging system. The infotainment system may have a head-up display 200. The infotainment system may have a circuit 540 of a central unit 500 connectable to head-up display 200 and to central information display 530. The central unit 500 may be configured to send second image data S200 to the head-up display 200 to be displayed. The head-up display 200 may be configured to project an image 201 onto the front windshield 110, as shown in FIG. 1. The image 201 may be based on second image data S200.

The central unit 500 may be configured to ascertain a user's point of view, the user's point of view being the position of the user's eyes. To ascertain the position of the user's eyes, the central unit 500 may be configured to evaluate image data S510 of an internal camera 510, recognizing the user's eyes and their position within the captured image.

The image 201 may be projected within an area 299. The projected image 201 may be predefined, and may be adjustable by the user. The area 299 may be positioned to the driver's view. The position of the area 299 may be adjusted to steering wheel 130, so that the image 201 is viewable by the driver who is also able to observe the traffic in front of the vehicle 100. The image 201 may be at least partially transparent, for example, semitransparent. At least parts of the area 299 may be transparent during driving, so that the driver's view is not disturbed significantly.

The infotainment system may have an interface 608 to a bus of the vehicle, e.g., a CAN bus, to retrieve vehicle data, e.g., the current speed, vehicle rain sensor data, and so forth. The infotainment system may have a satellite receiver 609 to receive position data S609 of the current position of the vehicle, such as GPS data or GLONASS data. The system may have a transceiver 610 for communicating with a wireless network such as, for example, a UMTS network, a LTE network, or a WLAN network.

The infotainment system may have one or more distance sensors 615, 616, 617, 619. The distance sensors 615, 616, 617, 619 may be ultrasonic sensors or radar sensors, or any other device or system for measuring a distance to an object in the surroundings of the vehicle 100. The one or more distance sensors 615, 616, 617, 619 may be connectable to central unit 500.

According to one embodiment of FIG. 2, the infotainment system may have adjustment means for adjusting the position of the projected image 201 within the plane of the front windshield 110. The adjustment means may be electromechanical drives for changing the position of the head-up display 200 or an optical element thereof. The central unit 500 may be configured to send parameters S201 for the adjustment to the head-up display 200. The central unit 500 may be configured to ascertain the user's point of view 301 based on parameters S201 of the adjustment of the projected image 201. The user may adjust the projected image 201 by inputting drive controls, on which the parameters S201 are based.

Figure 3:
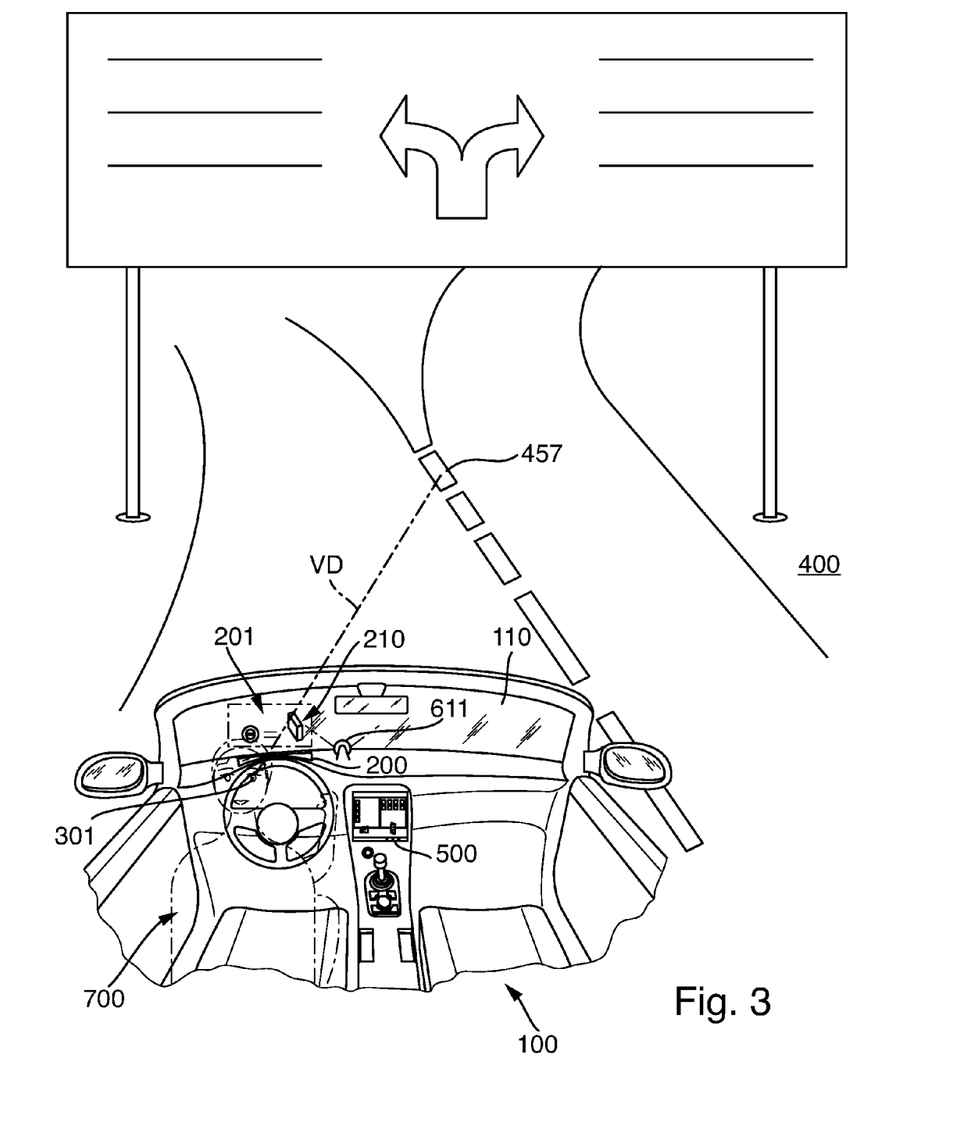
FIG. 3 a schematic view of a vehicle in its surroundings.

FIG. 3 shows a three-dimensional schematic view of a vehicle 100 in its surrounding 400. The vehicle 100 is driven by the user 700 in the driver position of the vehicle 100. The user 700 is shown in a transparent manner to additionally show the dashboard and the windshield 110 in front of the user 700. According to one embodiment shown in FIG. 4 a system is provided in the vehicle 100. The system may have a central unit 500 and a head-up display 200 connectable to the central unit 500. The head-up display 200 is configured to project an image 201 onto the windshield 110 of the vehicle 100.

Additionally shown in FIG. 3 is the point of view 301 of the user 700, the point of view 301 being the position of the user's eyes. The user may look through the windshield 110 viewing the surrounding 400 of the vehicle 100, e.g. roads and traffic. Image 201 projected onto the windshield 110 appears within the field of view of user 700. The image 201 may be semitransparent.

According to one embodiment, the system may have as recording means a front camera 611 for recording first image data of surroundings 400 in front of vehicle 100. The front camera 611 may be connected to central unit 500. The central unit 500 may be configured to run a program with several method steps. The functions explained below can be executed by the steps of the program.

An object 457 of surroundings 400 may be recognized by central unit 500 based on the recorded first image data of front camera 611. In one embodiment shown in FIG. 3, the recognized object is a road marking 457, e.g., between two lanes.

Second image data may be generated by means of the central unit 500 for outputting the image 201 and sent to the head-up display (200), whereby a virtual barrier 210 may be generated by the central unit 500 in the second image data. It is shown in FIG. 3 that barrier 210 is positioned in the view direction VD of driver 700 to recognized object 457. In this case, a bottom area of virtual barrier 210 overlaps the recognized road marking 457 and is therefore positioned in a straight line between eye position 301 of driver 700 and the recognized road marking 457. The barrier 210 can be moved onto road marking 457 and carried along depending on the movement of vehicle 100.

According to one embodiment the virtual barrier 210 is to be aligned to the recognized object 457 in the surroundings 400. In the view of the user 700 a virtual barrier 210 within the image 201 may be projected onto the windshield 110 of the vehicle. The virtual barrier 210 may be output as a part of the image data S200 by means of the central unit 500. A user's point of view 301 may be ascertained by means of the central unit 500. The user's point of view is the position 301 of the user's eyes.

Figure 4:
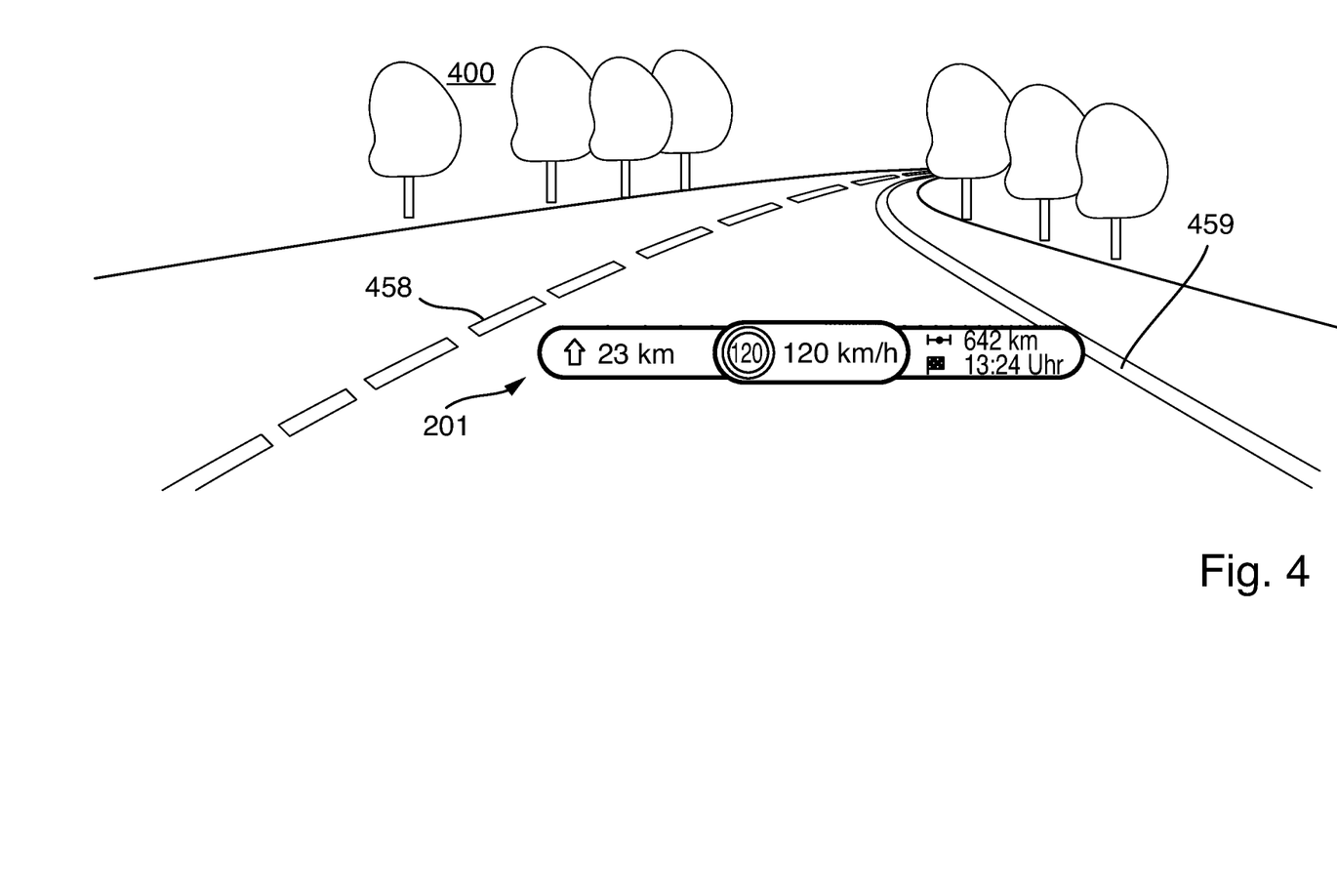
FIG. 4 a schematic view through the windshield of a vehicle.

A view of driver 700 through windshield 110 of vehicle 100 according to FIG. 3 is shown schematically in FIG. 4. Surroundings 400 are shown here schematically by a thin line. In contrast, elements of image 201 projected onto windshield 110 are emphasized by thicker lines. Driver 700 therefore sees in the same view direction both the surroundings and, e.g., semitransparent image 201. In one embodiment of FIG. 4, image 201 may show a speed display with a current speed of 120 km/h, a speed limit, and a distance to the destination of 642 km and a distance to the next maneuver point of 23 km.

According to one embodiment of FIG. 4 the central unit 500 may be configured to recognize markings 458, 459 on the road. The markings 458, 459 may be regarded as objects. The central unit 500 may be configured to estimate the current position of vehicle 100 in relation to the recognized markings 458, 459. In FIG. 4 the recognized markings 458, 459 may be superposed by virtual elements showing the successful recognition to the user 700.

Figure 5:
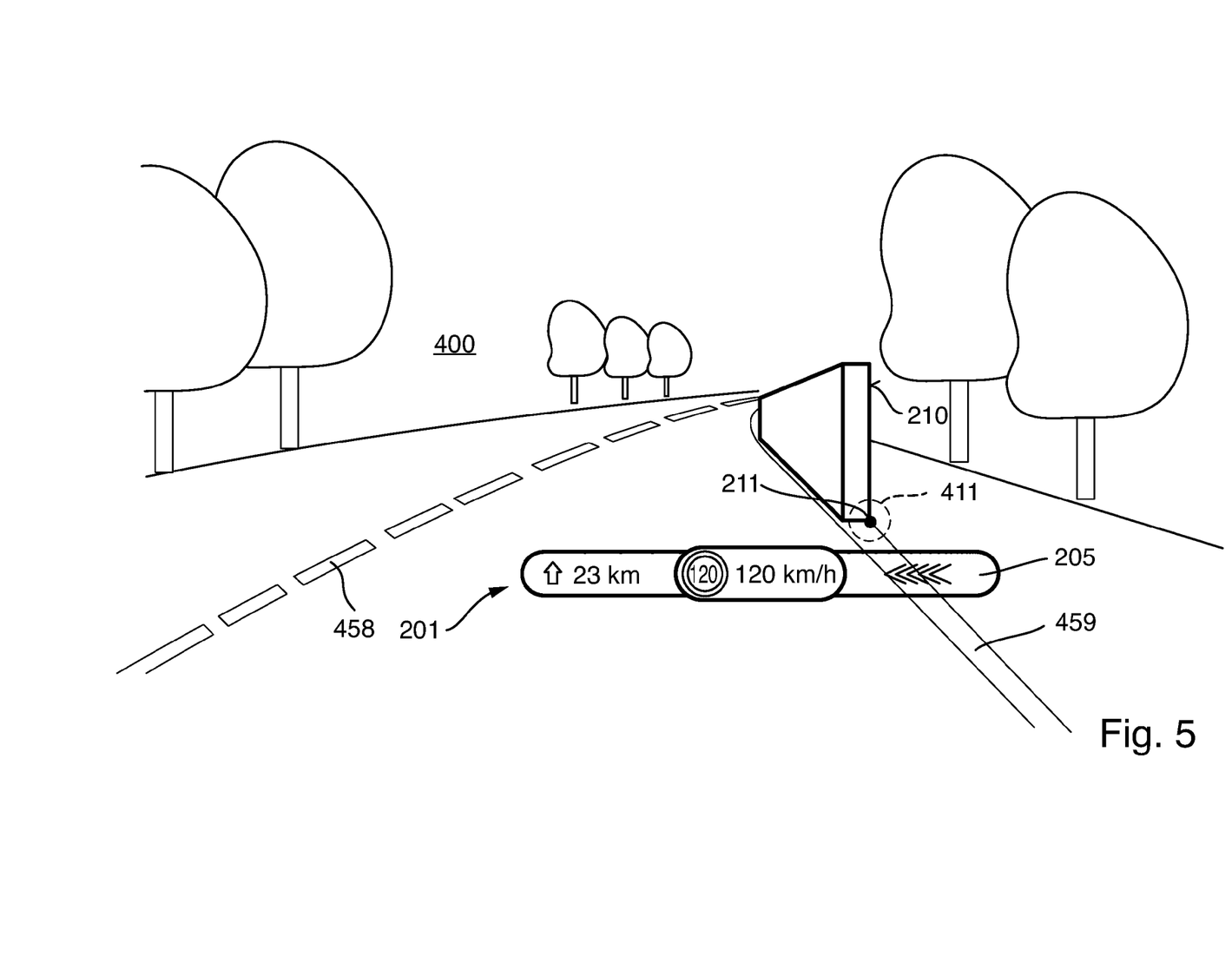
FIG. 5 a further schematic view through the windshield of a vehicle.

FIG. 5 shows a view of driver 700 of surroundings 400 through windshield 110 of vehicle 100 in the direction of travel in front of vehicle 100. An image 201 projected on windshield 110 may have a barrier 210. According to one embodiment in FIG. 5, the virtual barrier may be a virtual wall 210. Virtual wall 210 in one embodiment of FIG. 5 is not shown as being transparent. Preferably, the virtual barrier 210 is semitransparent, however, to make it possible for driver 700 to have a view of real elements, e.g., playing children, located behind the virtual barrier. In one embodiment of FIG. 5, recognized object 459 may be a road marking 459 that limits the lane on the side. Moreover, a further road marking 458 is shown schematically as a center line.

According to one embodiment of FIG. 5, an infotainment system of a vehicle 100 that includes an imaging system is provided. The infotainment system may have a head-up display 200. The infotainment system may have means 611, 615 for recognizing a limitation of the road liming the driving space on the road. The limitation is visible for a user 700 in the vehicle 100. The limitation may be a marking 459 on the road or wall or curb. The means may be a camera 611. The infotainment system may have a central unit 500 connectable to the head-up display 200 and to the means 611 for recognizing.

The central unit 500 may be configured to send image data S200 to the head-up display 200 to be displayed. The head-up display 200 may be configured to project an image 201 onto the front windshield 110 visible to the user 700 (such as the driver) in the vehicle 100. The image 201 may be based on the image data S200.

The central unit 500 may be configured to output a virtual barrier 210, when an estimated distance between the vehicle 100 and the recognized limitation 459 is below a threshold. The central unit 500 may be configured to include the virtual barrier 210 in the image data S200 so that a position of the virtual barrier 210 and the position of the limitation 459 overlap in a view of the user 700 of the vehicle 100. A virtual point 411 of the limitation 459 in the surrounding 400 of the vehicle 100 may be ascertained based on the recorded image. In the view of the user 700 at least one point 211 of the virtual barrier 210 may be aligned to the virtual point 411 by means of the central unit 500, wherein the alignment is based on the user's point of view 301. Additionally a plurality of points of the virtual barrier 210 may be aligned to a plurality of virtual points of the recognized limitation, so that the shape of the virtual barrier 210 may be adapted to the course of the limitation.

According to one embodiment of FIG. 5 the virtual barrier 210 is a red, semi-transparent wall overlapping the white marking 459 limiting the lane in which the driver 700 should drive. Additionally the image 201 has an animated (flashing) arrow 205, showing the direction for correct driving.

Figure 6:
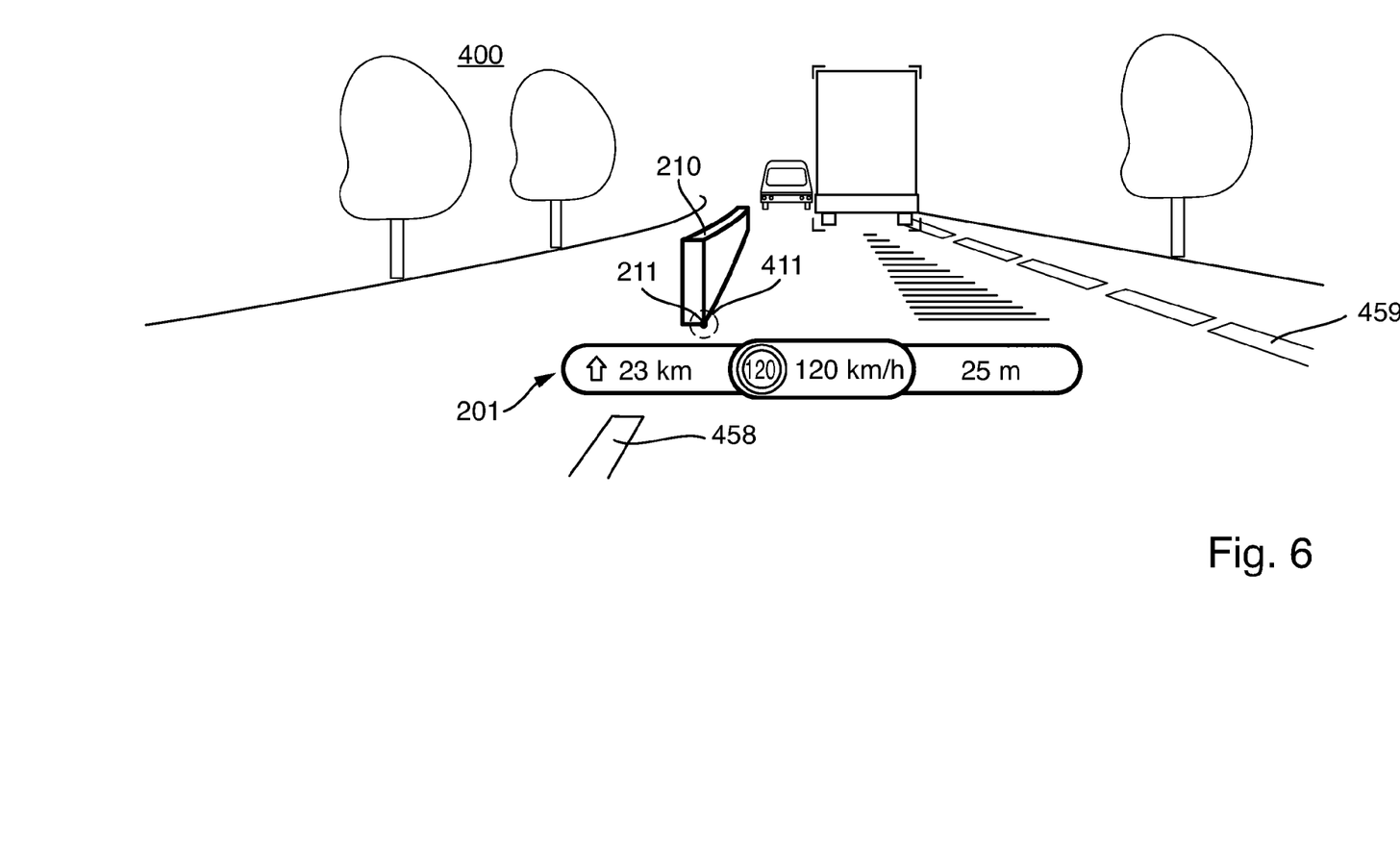
FIG. 6 a further schematic view through the windshield of a vehicle.

FIG. 6 shows a view of driver 700 of surroundings 400 through windshield 110 in the direction of travel in front of vehicle 100. In one embodiment of FIG. 6, the system may have means 613, 617 for recognizing an object, particularly another vehicle in the blind spot. The presence of the other vehicle in the blind spot can be recognized by a camera, 613 or by a radar sensor 616.

According to one embodiment, central unit 500 may be configured to recognize a road user located in the blind spot or approaching the blind spot. According to one embodiment, central unit 500 may be configured to generate a warning signal S3 depending on the recognition of the road user in the blind spot. Warning signal S3 may be evaluated by central unit 500 and virtual barrier 210 in image 201 may be output based on warning signal S3.

According to one embodiment of FIG. 6, an infotainment system of a vehicle 100 is provided. The infotainment system may have a head-up display 200. The infotainment system may have means 611 for recognizing a marking 458 separating two lanes of a road, the marking 458 being visible to a user 700 in the vehicle 100. The marking 458 may also be referred to as the center line. The infotainment system may have a central unit 500 connectable to the head-up display 200 and the means 611 for recognizing.

The central unit 500 may be configured to send image data S200 to the head-up display 200 to be displayed. The head-up display 200 may be configured to project an image 201 onto the front windshield 110 visible to the user 700 (such as the driver) in the vehicle 100. The image 201 may be based on the image data S200.

The central unit 500 is configured to output a virtual barrier 210 as a symbol 210, when a road user is detected on the other side of the marking 458. The road user may not be visible to the user of the vehicle 100, if the road user is currently in the blind spot. The road user may be detected by evaluating the signals of distance sensors or image data.

The central unit 500 may be configured to include the virtual barrier 210 in the image data S200 so that a position of the virtual barrier 210 and the position of the marking 458 overlap in a view of the user 700 of the vehicle 100. A virtual point 411 of the marking 458 in the surrounding 400 of the vehicle 100 may be ascertained based on the recorded image. In the view of the user 700 at least one point 211 of the virtual barrier 210 may be aligned to the virtual point 411 by means of the central unit 500, wherein the alignment is based on the user's point of view 301.

According to one embodiment of FIG. 6 the virtual barrier 210 is a red semi-transparent wall placed on the white marking 458 on the road.

The invention is not limited to the shown embodiments in FIGS. 1 through 6. For example, it is possible to provide other virtual barriers, such as semitransparent curtains, crash barriers, or the like. It is also possible to change properties of the virtual barrier, such as the degree of transparency or the color or brightness depending on the distances to the recognized objects. It is likewise possible to output the virtual barrier also depending on traffic rules to indicate, for example, the unallowable entry into a one-way street. The virtual barrier can be used, moreover, for displaying maneuver instructions, in order to prevent entry into a "wrong" street. The functionality of the system according to FIG. 2 can be used especially advantageously for an infotainment system.

LIST OF REFERENCE CHARACTERS

100 Vehicle
110 Windshield
120 Dashboard
130 Steering wheel
140, 150 Seat
170 Gearshift
200 Head-up display
201 Image
205 Symbol
210 Virtual barrier
211 Point
299 Area
400 Surroundings
411 Point
457, 458, 459 Object
500 Central unit
510 Internal camera
520, 530 Display
540 Circuit
541, 542 Function block
601, 602 Gesture sensor
603, 604 Input Device
605 Microphone
606, 607 Near Field Communication Device
609 Satellite receiver, GPS
608 Bus interface
610 Transceiver
611, 612, 613, 614 Camera
615, 616, 617, 619 Radar sensor
791, 792 Mobile phone, smartphone
VD View direction
S3 Warning signal
S200, S201, S510, S520, S530, S609, S611, S612 Data

The invention claimed is:

1. A system for a vehicle, comprising:
a head-up display,
a central unit having a circuit, connected to the head-up display wherein the central unit is configured to recognize a position of a driver's eyes, and
a recording means for recording first image data of surroundings of the vehicle, whereby the recording means is connected to the circuit,
wherein the circuit is configured to recognize an object in the surroundings based on the recorded first image data,
wherein the head-up display is configured to project an image onto a windshield or onto a combiner of the vehicle in a field of view of a driver,
wherein the circuit is configured to generate second image data for outputting the image and to send the image to the head-up display,
wherein the circuit is configured to generate a three-dimensional virtual barrier in the second image data wherein the three-dimensional virtual barrier comprises a virtual wall or a row of traffic cones,
wherein the circuit is configured to position the three-dimensional virtual barrier within the image based on a determined position of the recognized object, whereby the positioned three-dimensional virtual barrier in a view direction (VD) of the driver to the recognized object overlaps the recognized object at least partially,
wherein the recognized object is a road marking or constructional boundary of a road,
wherein the circuit is configured to align a plurality of points of the three-dimensional virtual barrier with a plurality of virtual points of the recognized object so that a shape of the three-dimensional virtual barrier is adapted to a course of the recognized object,
wherein the three-dimensional virtual barrier is semi-transparent, and
wherein a degree of transparency of the three-dimensional virtual barrier is changed depending on a determined distance of the vehicle to the recognized object.

2. The system according to claim 1,
wherein the three-dimensional virtual barrier is a virtual wall.

3. The system according to claim 1,
wherein the circuit is configured to generate the three-dimensional virtual barrier when a warning signal (S3) exceeds a threshold.

4. The system according to claim 3,
wherein the circuit is configured to generate the warning signal (S3) based on a determined distance of the vehicle to the object.

5. The system according to claim 3,
wherein the circuit is configured to generate the warning signal (S3) based on traffic rules.

6. The system according to claim 1,
wherein the circuit is configured to recognize a road user,
wherein the circuit is configured to generate a warning signal (S3) depending on recognition of the road user in a blind spot, and
wherein the circuit is configured to generate the three-dimensional virtual barrier based on the warning signal (S3).

7. The system according to claim 1,
wherein the circuit is further configured to generate an animated arrow in the second image data, the animated arrow showing a direction for correct driving.

8. The system according to claim 1,
wherein the three-dimensional virtual barrier is generated with at least one of a color and a brightness, and
wherein the at least one of the color and the brightness depends on a determined distance of the vehicle to the object.

9. The system of claim 1, wherein the circuit is configured to align the plurality of points of the three-dimensional virtual barrier with the plurality of virtual points of the recognized object based on a point of view of a user in the vehicle.

10. A system for a vehicle, comprising:
a head-up display;

a central unit having a circuit, connected to the head-up display, wherein the central unit is configured to recognize eyes of a driver; and a camera for recording first image data of surroundings of the vehicle, whereby the camera is connected to the circuit, wherein the circuit is configured to recognize an object in the surroundings based on the recorded first image data, wherein the head-up display is configured to project an image onto a windshield or onto a combiner of the vehicle in a field of view of the driver, wherein the circuit is configured to generate second image data for outputting the image and to send the image to the head-up display, wherein the circuit is configured to generate a virtual barrier in the second image data, wherein the circuit is configured to position the virtual barrier within the image based on a determined position of the recognized object, whereby the positioned virtual barrier in a view direction (VD) of the driver to the recognized object overlaps the recognized object at least partially, wherein the circuit is configured to recognize a road user, wherein the circuit is configured to generate a warning signal (S3) depending on recognition of the road user in a blind spot of the vehicle, wherein the circuit is configured to generate the virtual barrier based on the warning signal (S3), wherein the recognized object is a road marking, wherein the circuit is configured to position the virtual barrier so that a bottom area of the virtual barrier overlaps the recognized object, wherein the virtual barrier is semi-transparent, and wherein a degree of transparency of the virtual barrier is changed depending on a determined distance of the vehicle to the recognized object.

11. A system for a vehicle, comprising:

a head-up display;

a central unit having a circuit, connected to the head-up display, wherein the central unit is configured to recognize a position of eyes of a driver; and a recording means for recording first image data of surroundings of the vehicle, whereby the recording means is connected to the circuit, wherein the circuit is configured to recognize an object in the surroundings based on the recorded first image data, wherein the head-up display is configured to project an image onto a windshield or onto a combiner of the vehicle in a field of view of the driver, wherein the circuit is configured to generate second image data for outputting the image and to send the image to the head-up display, wherein the circuit is configured to generate a three-dimensional virtual barrier in the second image data, wherein the three-dimensional virtual barrier comprises a virtual wall or a row of traffic cones, wherein the circuit is configured to position the three-dimensional virtual barrier within the image based on a determined position of the recognized object, whereby the positioned three-dimensional virtual barrier in a view direction of the driver to the recognized object overlaps the recognized object at least partially, wherein the recognized object is a traffic sign, and wherein the traffic sign represents a "no entry" sign and is placed at an exit end of a one-way street, and wherein the three-dimensional virtual barrier is positioned to overlap the traffic sign and to virtually close the exit end of the one-way street to virtually hinder the driver from entering and driving in a wrong direction on the one-way street.

* * * * *

UNITED STATES PATENT AND TRADEMARK OFFICE
CERTIFICATE OF CORRECTION

PATENT NO. : 10,081,370 B2  
APPLICATION NO. : 14/654477  
DATED : September 25, 2018  
INVENTOR(S) : Roth et al.

Page 1 of 1

It is certified that error appears in the above-identified patent and that said Letters Patent is hereby corrected as shown below:

On the Title Page (72) Inventor ADD:  
-- Christoph Reifenarth, Erftstadt, DE (US);  
Alex Wackemagel, Vilters, CH  
Stefan Marti, Oakland, CA (US);  
Kelei Shen, Dulach, DE (US) --.

Signed and Sealed this  
Fifteenth Day of November, 2022

Katherine Kelly Vidal  
*Director of the United States Patent and Trademark Office*